US009010985B2

United States Patent
Liao

(10) Patent No.: US 9,010,985 B2
(45) Date of Patent: Apr. 21, 2015

(54) DISPLAY DEVICE WITH SYSTEMATIC BACK PLATE

(75) Inventor: Chien-Ting Liao, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 212 days.

(21) Appl. No.: 13/610,956

(22) Filed: Sep. 12, 2012

(65) Prior Publication Data

US 2013/0128621 A1 May 23, 2013

(30) Foreign Application Priority Data

Nov. 22, 2011 (TW) .............................. 100142689 A

(51) Int. Cl.
*F21V 7/04* (2006.01)
*G02F 1/1335* (2006.01)
*G02F 1/1333* (2006.01)

(52) U.S. Cl.
CPC ............ *G02F 1/133608* (2013.01); *G02F 2001/133328* (2013.01); *G02F 2001/133317* (2013.01); *G02F 1/133308* (2013.01); *G02F 2001/133314* (2013.01)

(58) Field of Classification Search
CPC ............ G02F 1/133308; G02F 1/133608; G02F 1/133603; G02F 1/133604; G02F 1/133615; G02F 1/133605; G02F 1/133314; G02F 1/133317; G02F 1/13332; G02F 1/133322; G02F 1/133328
USPC ............. 362/97.2, 97.3, 632, 633, 634; 349/58
See application file for complete search history.

(56) References Cited

U.S. PATENT DOCUMENTS

| 6,853,410 B2 * | 2/2005 | Matsuda et al. ............. 362/632 |
| 8,021,034 B2 * | 9/2011 | Lee et al. ................... 362/633 |
| 8,553,171 B2 * | 10/2013 | Ryu et al. .................... 349/58 |
| 2003/0218700 A1 * | 11/2003 | Tsukamoto ................... 349/58 |

FOREIGN PATENT DOCUMENTS

| TW | 200743850 | 12/2007 |
| TW | 201122330 A | 7/2011 |

OTHER PUBLICATIONS

English translation of abstract of TW 200743850.
English translation of abstract and cited description of TW 201122330 A (published Jul. 1, 2011).
Taiwan Office Action dated May 20, 2014.

* cited by examiner

*Primary Examiner* — Y M Lee
(74) *Attorney, Agent, or Firm* — McClure, Qualey & Rodack, LLP

(57) ABSTRACT

A display device includes a systematic back plate, a backlight module, and a display panel. The systematic back plate includes a first plate and a second plate. The first plate includes a supporting face and a first side, wherein the first side extends to form a bending part. The bending part bends back with respect to the supporting face and extends toward the center of the supporting face, wherein the bending part forms a clamping space with the supporting face. The first plate and the second plate are made of different materials. The second plate includes a connecting end connecting to the boundary of the first side and the bending part. The backlight module is disposed on the supporting face and supported by the supporting face. At least a portion of the backlight module is received in the clamping space. The display panel is disposed above the backlight module.

10 Claims, 7 Drawing Sheets

DISPLAY DEVICE WITH SYSTEMATIC BACK PLATE

BACKGROUND OF THE INVENTION

1. Field of the Invention

This invention generally relates to a display device and more particularly, to a display device with a systematic back plate.

2. Description of the Prior Art

With the progress of electronic technology and the popularization of computer application, various portable electronic devices are generally used in our daily life. Laptop computers are popular and widely used due to the powerful information processing ability and the portable size/volume. On the other hand, in addition to components such as display panel and backlight module for displaying images, the display device of commercially available laptop computer usually has components such as camera and antenna for visual communication and Internet application.

As the prior art shown in FIG. 1, a display device 80 of a common laptop computer includes a systematic back plate 10, a backlight module 30, and a display panel 50. The systematic back plate 10 includes a first plate 11 and a second plate 12. The backlight module 30 is disposed in the first plate 11 and includes a light guide plate 31 and a light source 32. Components such as camera 60 and antenna are disposed in the second plate 12. In order to fix the backlight module 30 in the first plate 11, devices such a clamping device 99 or a reflecting cover are disposed to clamp the light source 32 as well as one end of the light guide plate 31. However, the disposing of the clamping device 99 will increase the material cost and the numbers of parts. In addition, the clamping device 99 has to be used with a frame 98, wherein the thickness of the display device is accordingly increased to receive the frame 98. It is disadvantageous for the display device 80 to get a thinner shape.

SUMMARY OF THE INVENTION

It is an object of the present invention to provide a display device having fewer parts.

It is an object of the present invention to provide a display device having thinner thickness.

The display device of the present invention includes a systematic back plate, a backlight module, and a display panel. The systematic back plate includes a first plate and a second plate. The first plate has a supporting face and a first side, wherein the first side extends to form a bending part. The bending part bends back with respect to the supporting face and extends toward the center of the supporting face, wherein the bending part forms a clamping space with the supporting face. The second plate is made of a material different from that of the first plate, wherein the second plate includes a connecting end connecting to the boundary of the first side and the bending part. The backlight module is disposed on the supporting face and supported by the supporting face, wherein at least a portion of the backlight module is received in the clamping space. The display panel is disposed above the backlight module.

The backlight module includes a light guide plate having an end inserted into the clamping space and clamped by the bending part. The backlight module includes a light source module received in the clamping space and connected to an inner side of the bending part. The light source module emits light to the end of the light guide plate inserted into the clamping space. The backlight module includes a light source module disposed on the other end of the light guide plate opposite to the bending part.

The bending part includes a sidewall and a platform, the sidewall extends away from the supporting face; the platform extends from the sidewall and bends toward the center of the supporting face with respect to the sidewall to form the clamping space. At least a portion of the display panel is supported by at least a portion of the platform. The connecting end of the second plate forms a supporting wall; the supporting wall is parallel to the sidewall. The outer side of the supporting wall is attached to the outer side of the sidewall. The supporting wall extends toward the first plate to form a rim, wherein the rim is disposed above the platform and supports the display panel. The second plate forms a receiving space with the bending part for receiving at least one electronic device.

DETAILED DESCRIPTION OF THE PREFERRED EMBODIMENT

Figure 1:
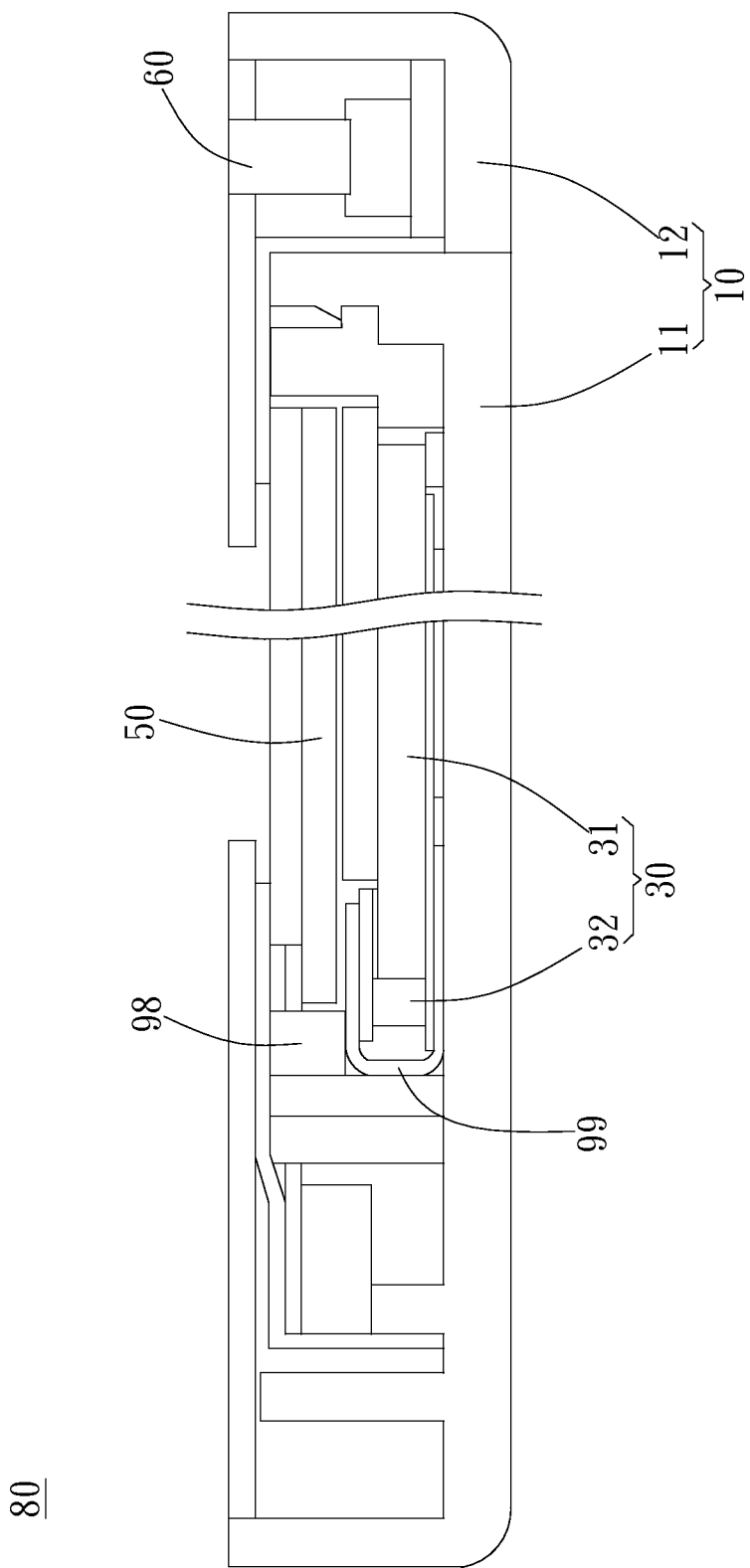
FIG. 1 is a schematic view of the prior art.
Figure 2:
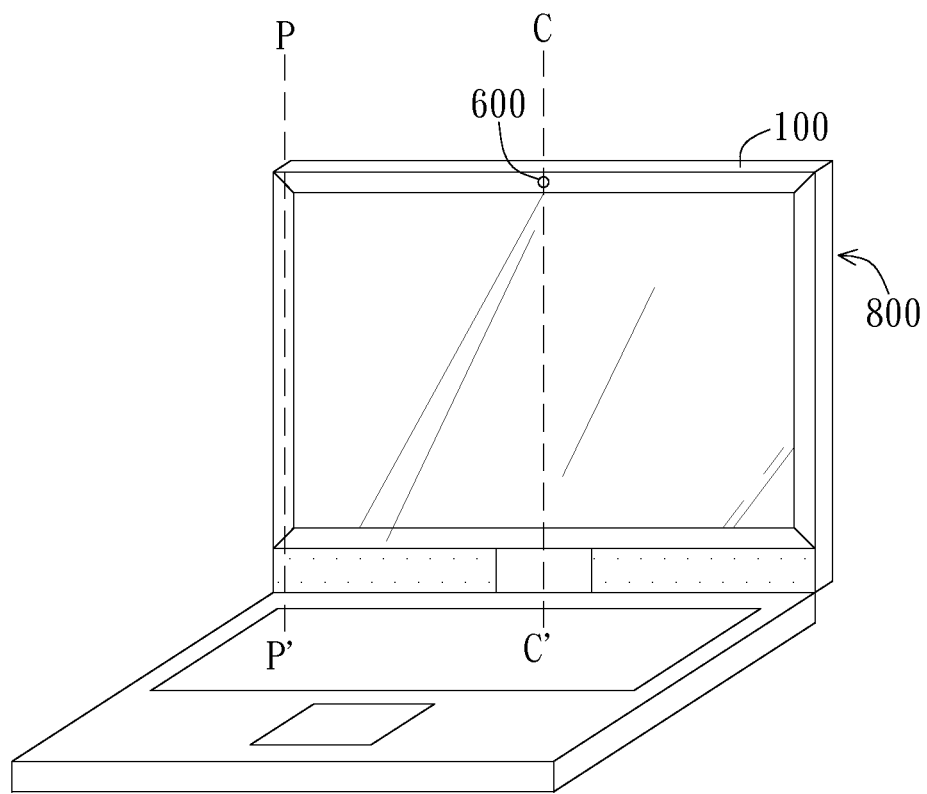
FIG. 2 is a schematic view of an embodiment of the display device of the present invention used in a laptop computer.
Figure 3:
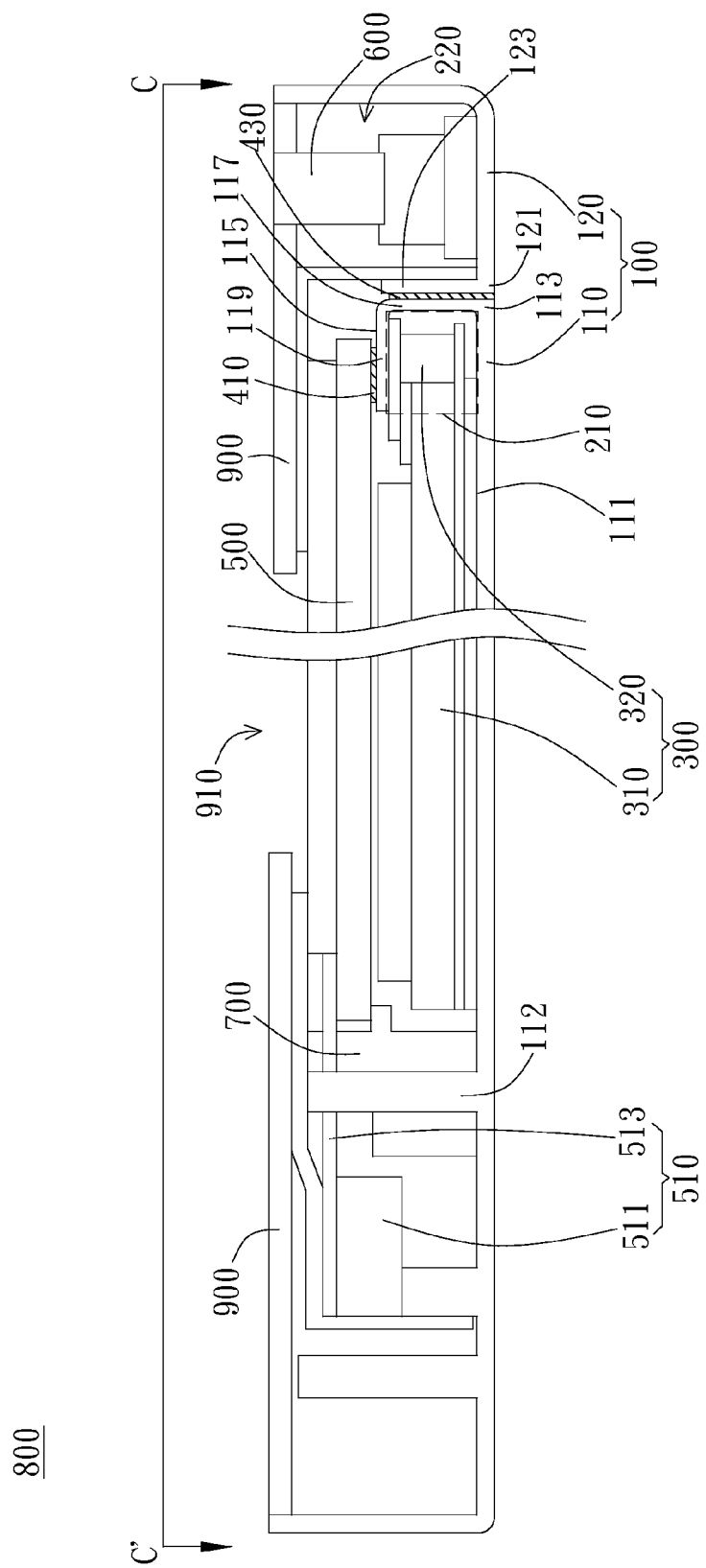
FIG. 3 is a schematic view of the preferred embodiment of the present invention.

As the embodiment shown in FIG. 2, the display device 800 of the present invention is preferably used in laptop computers having electronic devices such as cameras 600 disposed close to the upper edge, but not limited thereto. More particularly, in different embodiments, this invention can be used in any suitable consumer electronics such as PDAs, cell phones, electronic books, digital photo-frames, digital cameras, MP3 players, digital dictionaries, and GPS Navigators. The structure of this invention not only can be used at the position close to the upper edge of the display device where antenna and cameras are usually disposed, but also can be used at any suitable position on the perimeter of the display device. The cross-sectional view of the center part of the display device 800 in FIG. 2, labeled by a cross-sectional line C-C', is shown in FIG. 3. In the preferred embodiment, the display device 800 of the present invention includes a systematic back plate 100, a backlight module 300, and a display panel 500. The systematic back plate 100 includes a first plate 110 and a second plate 120.

As the preferred embodiment shown in FIG. 3, the first plate 110 includes a supporting face 111 and a first side 113, wherein the first side 113 extends to form a bending part 115. The bending part 115 bends back with respect to the supporting face 111 and extends toward the center of the supporting face 111, wherein the bending part 115 forms a clamping space 210 with the supporting face 111. The bending part 115 preferably includes a sidewall 117 and a platform 119. The sidewall 117 extends away from the supporting face 111. The platform 119 extends from the sidewall 117 and bends toward the center of the supporting face 111 with respect to the sidewall 117 to form the clamping space 210. At least a portion of the display panel 500 is supported by at least a portion of the platform 119.

Taking a different view, as the preferred embodiment shown in FIG. 3, the first plate 110 is a metal plate bent toward the center of the supporting face 111 from the first side 113 to form a U-shaped cross-sectional structure. The platform 119 and the sidewall 117 of the bending part 115 are respectively the top and right sides of the U-shaped cross-sectional structure, wherein the supporting face 111 is the bottom side of the U-shaped cross-sectional structure. The clamping space 210 is formed in the U-shaped cross-section structure. At least a portion of the display panel 500 is supported by the outer face of the platform 119, which is the upper face of the top side of the U-shaped cross-sectional structure. The display device further includes a fixing tape 410, wherein the two sides of the fixing tape 410 are respectively attached to the outer side of the platform 119 and the back side of the display panel 500 opposite to display face. In other words, the portion of the display panel 500 supported by the outer side of the platform 119 can be attached to the outer side of the platform 119 by the fixing tape 410 to increase the fixity between the display panel 500 and the first plate 110.

As the preferred embodiment shown in FIG. 3, the second plate 120 is made of a material different from that of the first plate 110, wherein the second plate 120 includes a connecting end 121 connecting to the boundary of the first side 113 and the bending part 115 of the first plate 110. The second plate 120 is preferably made of plastic. More particularly, the boundary of the first side 113 and the bending part 115 refers to a curve edge formed by the bending of the first plate 110 toward the center of the supporting face 111 from the first side 113. The connecting end 121 of the second plate 120 forms a supporting wall 123, wherein the supporting wall 123 is parallel to the sidewall 117. The outer side of the supporting wall 123 is attached onto the outer side of the sidewall 117. The display device further includes a fixing tape 430, wherein the two sides of the fixing tape 430 are respectively attached to the outer side of the supporting wall 123 and the outer side of the sidewall 117 to increase the fixity between the display panel 500 and the first plate 110.

As the preferred embodiment shown in FIG. 3, the backlight module 300 is disposed on the supporting face 111 and supported by the supporting face 111, wherein at least a portion of the backlight module 300 is received in the clamping space 210. The display panel 500 is disposed above the backlight module 300. Compared with prior arts having clamping devices for clamping the backlight module 300, in the display device 800 of the present invention, at least a portion of the backlight module 300 received in the clamping space 210 can be clamped together by the bending part 115 and the supporting face 111 formed from the first plate 110. Therefore, the material cost, the numbers of parts, and the thickness of the display device can be reduced.

As the preferred embodiment shown in FIG. 3, the backlight module 300 includes a light guide plate 310 having an end inserted into the clamping space 210 and clamped by the bending part 115. The backlight module 300 includes a light source module 320 received in the clamping space 210 and connected to an inner side of the bending part 115. The light source module 320 emits light to the end of the light guide plate 310 inserted into the clamping space 210. In other words, in the preferred embodiment, the clamping space 210 can receive/accommodate the light source module 320 and the end of the light guide plate 310 inserted into the clamping space 210. Thus, the bending part 115 can cover the light source module 320 to reduce the light emitted by the light source module 320 leaking out to the directions other than the direction that the end of the light guide plate 310 is inserted into the clamping space 210. On the other hand, since the bending part 115 is preferably made of metal, the quantity of the light emitted to the end of the light guide plate 310 inserted into the clamping space 210 can be increased by the light reflection of the bending part 115. In a different embodiment shown in FIG. 4, however, the light source module 320 is disposed on the other end of the light guide plate 310 opposite to the bending part 115. Thus, by increasing the portion of the light guide plate 310 inserted into the clamping space 210, the clamping of the light guide plate 310 by the bending part 115 and the supporting face 111 can be enhanced.

Figure 4:
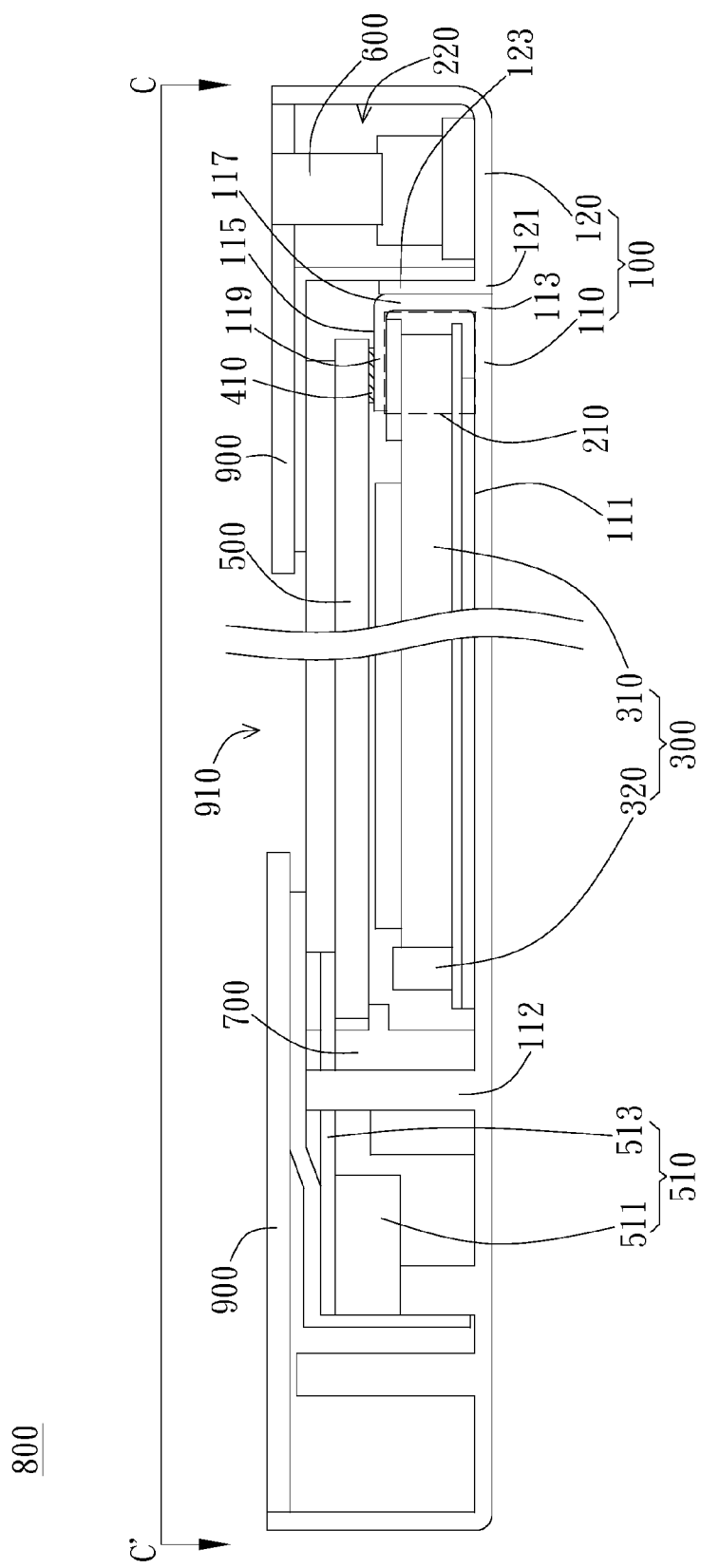
FIGS. 4 to 6 are schematic views of different embodiments of the present invention.

As an embodiment shown in FIG. 4, the second plate 120 forms a receiving space 220 with the supporting wall 123 for receiving devices and/or cables such as camera 600 and antenna. In another embodiment shown in FIG. 5, however, the second plate 120 forms a receiving space 220 with the bending part 115 for receiving devices and/or cables such as camera 600 and antenna. In other words, in this embodiment, the second plate 120 connects to the boundary of the first side 113 and the bending part 115 directly via the connecting end 121 and forms the receiving space 220 together with the bending part 115.

Figure 6:
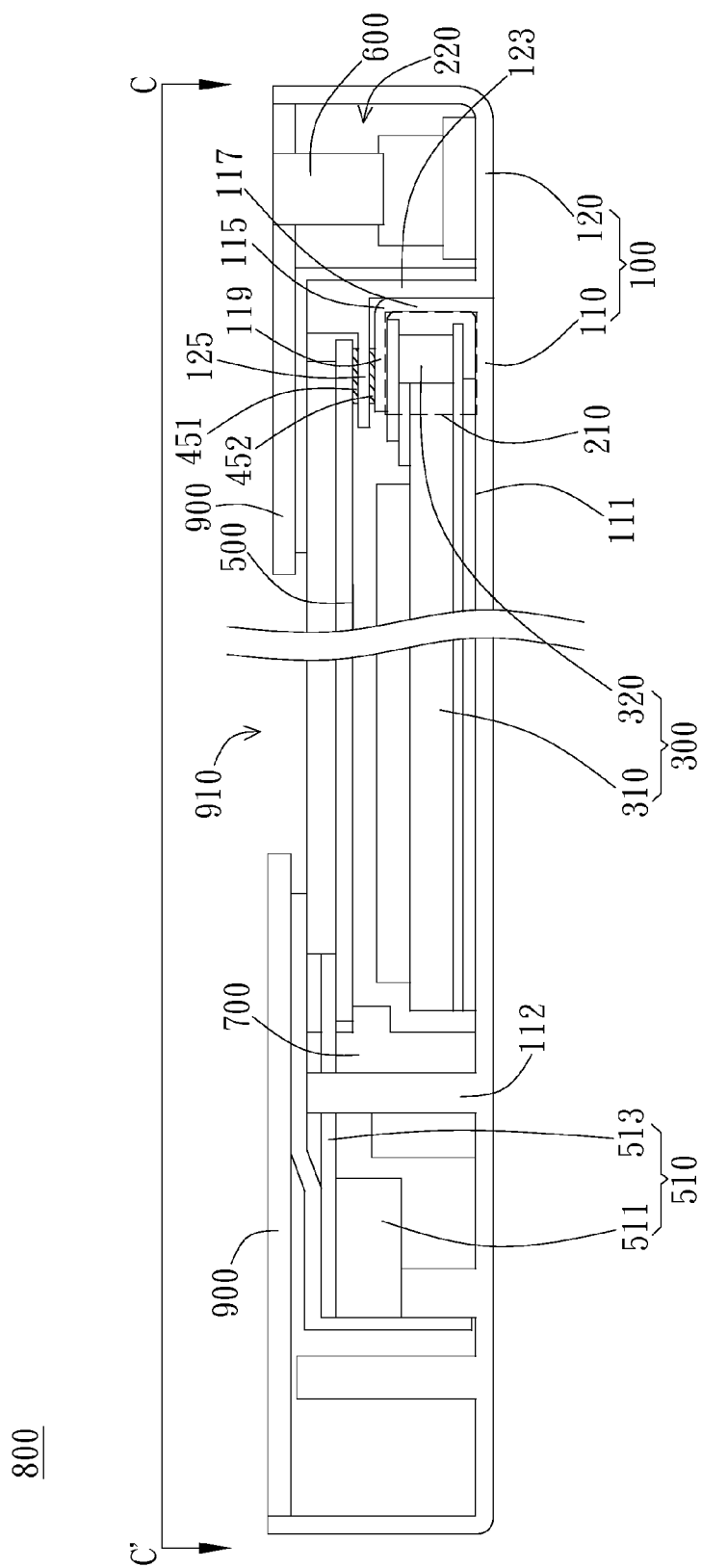

As the embodiments shown in FIGS. 3 and 4, at least a portion of the display panel 500 is supported by the outer face of the platform 119. In other words, the display panel can be supported by the first plate 110. In other embodiments, however, the display panel 550 can be supported by the second plate 120. As shown in FIG. 6, the supporting wall 123 of the second plate 120 extends toward the first plate 110 to form a rim 125, wherein the rim 125 is disposed above the platform 119 and supports the display panel 500. The top side and the bottom side of the rim 125 are respectively attached to the display panel 500 and the outer face of the platform 119. In other words, a portion of the bottom face of the display panel 500 is attached to the top side of the rim 125 of the second plate 120 by the fixing tape 451, wherein the bottom side of the rim 125 is attached to the outer face of the platform 119 of the first plate 110 by the fixing tape 452. Thus, the second plate 120 not only supports the display panel 500 with the rim 125 but also enhances the fixity between the display panel 500, the second plate 120, and the first plate 110.

Figure 5:
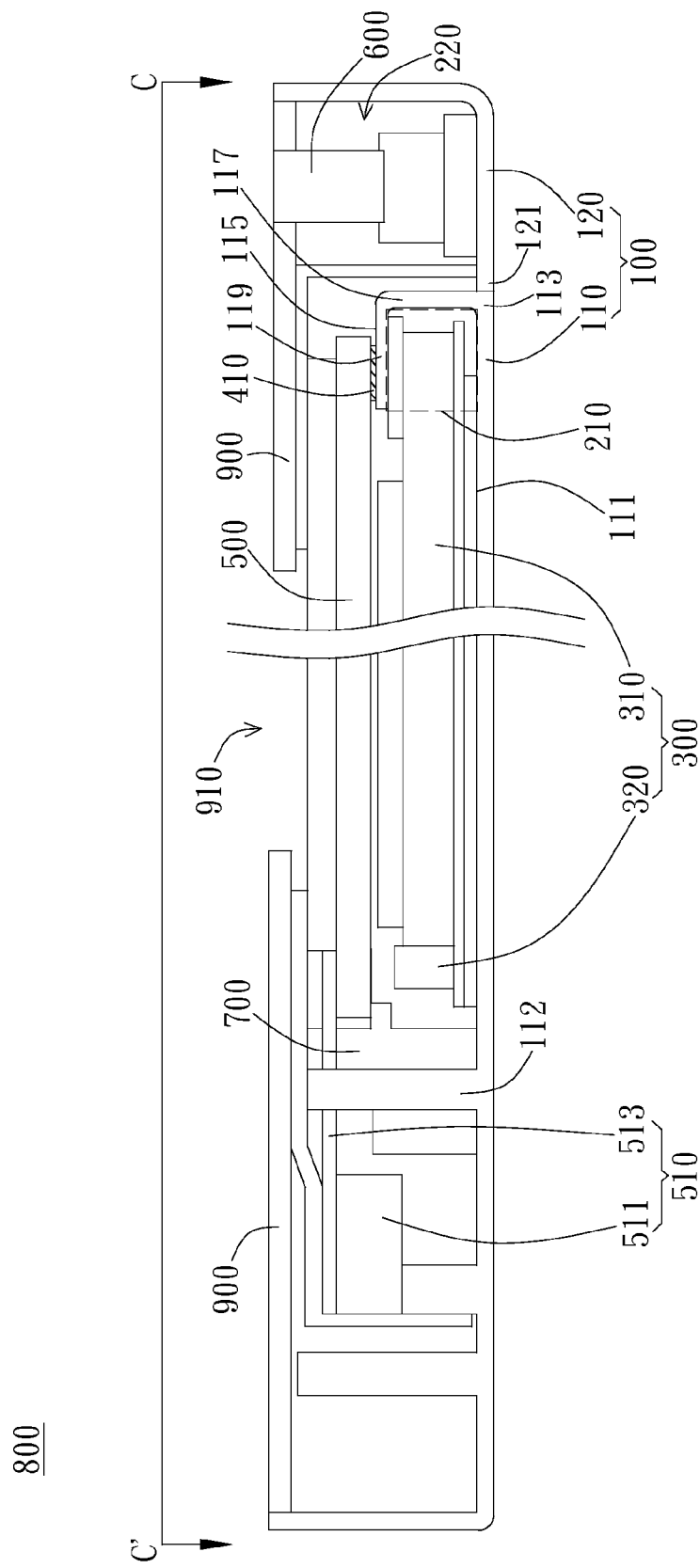

As the embodiment shown in FIG. 6, the display device 800 further includes a supporting frame 700 disposed on the supporting face 111 and supports an end of the display panel 500 opposite to the bending part 115. In other words, the display panel 500 can be supported by the supporting frame 700 and the rim 125 of the second plate 120 as shown in FIG. 6 or be supported by the supporting frame 700 and the platform 119 of the first plate 110 as shown in FIGS. 3, 4, and 5. The display panel 500 includes a controlling circuit module 510 extending outward from an end opposite to the bending part 115. The first plate 110 includes a circuit supporting part 112 protruding up from the supporting face 111. The controlling circuit module 510 preferably includes a printed circuit board 511 and a flexible circuit board 513. The display device 800 further includes a systematic front cover 900, wherein the fringe of the systematic front cover 900 covers the first plate 110 and the second plate 120 for besieging the display panel 500 and the backlight module 300 between the systematic front cover 900 and the first plate 110. The systematic front cover 900 has an opening 910 exposing the display face of the display panel 500.

Figure 7A:
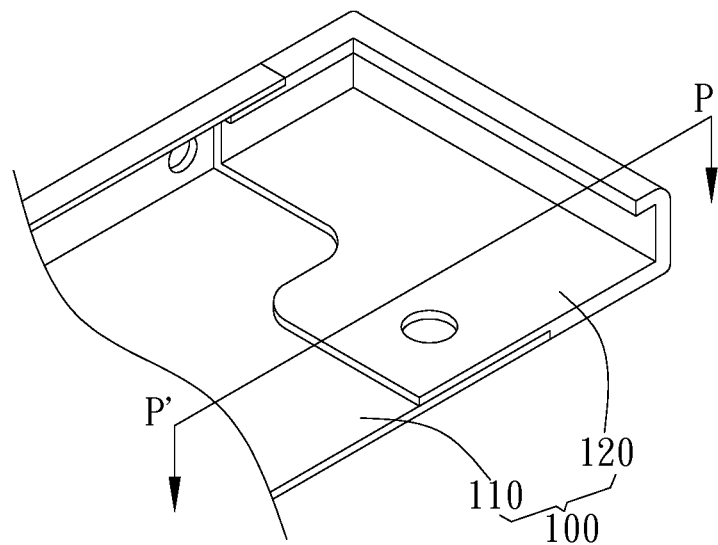
FIGS. 7A and 7B are respectively an assembled view and an exploded view of the first plate and the second plate of the systematic back plate of the present invention.
Figure 7B:
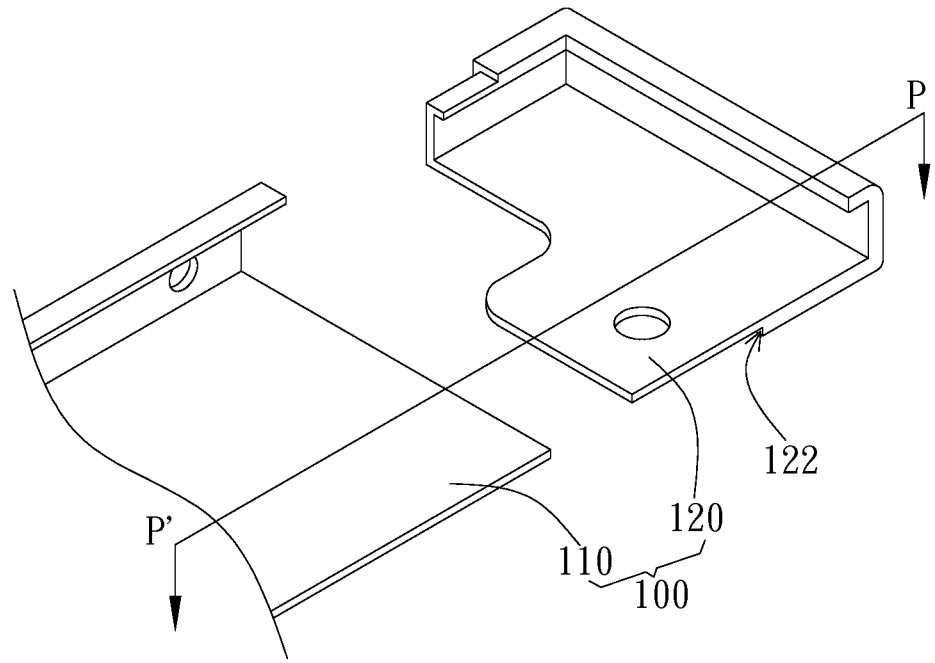

On the other hand, the first plate 110 and the second plate 120 are preferably fixed with each other at two sides of the display device 800. More particularly, the cross-sectional view of the side part of the display device 800 in FIG. 2, labeled by a cross-sectional line P-P', and its exploded view are respectively shown in FIGS. 7A and 7B. The first plate 110 and the second plate 120 of the systematic back plate 100 are preferably fixed with each other at two sides of the display device 800 by engaging, pasting, screwing, etc. The second plate 120 has a step height with respect to the first plate 110 at the fixing position for enhancing the connection between the first plate 110 and the second plate 120.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
  a systematic back plate, including:
    a first plate having a supporting face and a first side, wherein the first side extends to form a bending part, the bending part bends back corresponding to the supporting face and extends toward the center of the supporting face, the bending part forms a clamping space with the supporting face;
    a second plate made of a material different from that of the first plate, wherein the second plate includes a connecting end connecting to the boundary of the first side and the bending part to form a receiving space adjusted to the bending part, wherein the boundary of the first side and the bending part refers to a curve edge formed by the bending of the first plate toward the center of the supporting face from the first side, wherein the second plate extends away the bending part from the connecting end;
  a backlight module disposed on the supporting face and supported by the supporting face, wherein at least a portion of the backlight module is received in the clamping space; and
  a display panel disposed above the backlight module.

2. The display device of claim 1, wherein the backlight module includes a light guide plate having an end inserted into the clamping space and clamped by the bending part.

3. The display device of claim 2, wherein the backlight module includes a light source module received in the clamping space and connected to an inner side of the bending part, the light source module emits light to the end of the light guide plate inserted into the clamping space.

4. The display device of claim 2, wherein the backlight module includes a light source module disposed on the other end of the light guide plate opposite to the bending part.

5. The display device of claim 1, wherein the bending part includes a sidewall and a platform, the sidewall extends away from the supporting face, the platform extends from the sidewall and bends toward the center of the supporting face with respect to the sidewall to form the clamping space.

6. The display device of claim 5, wherein at least a portion of the display panel is supported by at least a portion of the platform.

7. The display device of claim 5, wherein the connecting end of the second plate forms a supporting wall, the supporting wall is parallel to the sidewall.

8. The display device of claim 7, wherein the outer side of the supporting wall is attached to the outer side of the sidewall.

9. The display device of claim 7, wherein the supporting wall extends toward the first plate to form a rim, the rim is disposed above the platform and supports the display panel.

10. The display device of claim 1, wherein the second plate forms a receiving space with the bending part for receiving at least one electronic device.

* * * * *